(12) United States Patent
Aoki

(10) Patent No.: US 6,409,348 B1
(45) Date of Patent: Jun. 25, 2002

(54) PROJECTOR

(75) Inventor: Kazuo Aoki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 69 days.

(21) Appl. No.: 09/654,065

(22) Filed: Sep. 1, 2000

(30) Foreign Application Priority Data

Sep. 8, 1999 (JP) .......................................... 11-253744

(51) Int. Cl.[7] .................. G03B 21/00; G03B 21/26; G03B 21/28; G03B 5/22; G02F 1/1335
(52) U.S. Cl. .................. 353/31; 353/34; 353/98; 359/885; 359/634; 349/8
(58) Field of Search .................. 353/98, 99, 30, 353/31, 32, 33, 34, 37, 81, 82, 94, 97, 102, 122; 349/5, 6, 7, 8; 359/885, 634

(56) References Cited

U.S. PATENT DOCUMENTS

| 3,785,722 A | * | 1/1974 | Schultz | 350/320 |
| 4,826,311 A | * | 5/1989 | Ledebuhr | 353/31 |
| 5,144,498 A | * | 9/1992 | Vincent | 359/885 |
| 5,696,564 A | * | 12/1997 | Hatakeyama | 348/756 |
| 6,250,764 B1 | * | 6/2001 | Aoki et al. | 353/31 |
| 6,273,568 B1 | * | 8/2001 | Okuyama | 353/31 |

FOREIGN PATENT DOCUMENTS

JP  A 10-177151  6/1998  .......... G02B/27/28

* cited by examiner

Primary Examiner—Russell Adams
Assistant Examiner—Melissa Koval
(74) Attorney, Agent, or Firm—Oliff & Berridge, PLC

(57) ABSTRACT

In an illumination optical system; a wavelength separating optical system; plural light modulation devices provided respectively so as to modulate the light in the plural wavelength regions according to a given image signal; a light synthesizing optical system for synthesizing the light modulated by the plural light modulation devices; a projection optical system for projecting the synthesized light emitted; and a reflecting mirror placed in the optical path. Light with a wavelength of approximately 425 nm is separated by the wavelength separating optical system and enters a corresponding light modulation device. The reflecting mirror has a reflectance of approximately 90% or more, for light in the wavelength region of approximately 435 nm or more, and a reflectance for light in the wavelength region of at least 425 nm±5 nm, that is lower than the reflectance for the light in the wavelength region of approximately 435 nm or more.

8 Claims, 11 Drawing Sheets

DESIGN WAVELENGTH λ: 600 nm
SUBSTRATE: GLASS (n = 1.52)
L-LAYER: $SiO_2$ (n = 1.46)
H-LAYER: $TiO_2$ (n = 2.3)

| LAYER | | D=n·d·4/λ |
|---|---|---|
| L | 1 | 1.000 |
| H | 2 | 1.090 |
| L | 3 | 0.832 |
| H | 4 | 1.090 |
| L | 5 | 0.832 |
| H | 6 | 1.090 |
| L | 7 | 0.832 |
| H | 8 | 1.090 |
| L | 9 | 0.832 |
| H | 10 | 1.090 |
| L | 11 | 0.832 |
| H | 12 | 1.090 |
| L | 13 | 0.832 |
| H | 14 | 1.090 |
| L | 15 | 0.832 |
| H | 16 | 1.090 |
| L | 17 | 0.832 |
| H | 18 | 2.326 |
| L | 19 | 0.810 |
| H | 20 | 2.326 |
| L | 21 | 0.810 |
| H | 22 | 2.326 |
| L | 23 | 0.810 |
| H | 24 | 2.326 |
| L | 25 | 0.810 |
| H | 26 | 2.326 |
| L | 27 | 0.810 |
| H | 28 | 2.326 |
| L | 29 | 0.810 |
| H | 30 | 1.150 |
| L | 31 | 1.000 |

FIG. 3(A)

DESIGN WAVELENGTH λ: 600 nm
SUBSTRATE: GLASS (n = 1.52)
L-LAYER: $SiO_2$ (n = 1.46)
H-LAYER: $Ta_2O_5$ (n = 2.1)

| LAYER | | D=n·d·4/λ |
|---|---|---|
| L | 1 | 1.000 |
| H | 2 | 1.090 |
| L | 3 | 0.832 |
| H | 4 | 1.090 |
| L | 5 | 0.832 |
| H | 6 | 1.090 |
| L | 7 | 0.832 |
| H | 8 | 1.090 |
| L | 9 | 0.832 |
| H | 10 | 1.090 |
| L | 11 | 0.832 |
| H | 12 | 1.090 |
| L | 13 | 0.832 |
| H | 14 | 1.090 |
| L | 15 | 0.832 |
| H | 16 | 1.090 |
| L | 17 | 0.832 |
| H | 18 | 2.326 |
| L | 19 | 0.810 |
| H | 20 | 2.326 |
| L | 21 | 0.810 |
| H | 22 | 2.326 |
| L | 23 | 0.810 |
| H | 24 | 2.326 |
| L | 25 | 0.810 |
| H | 26 | 2.326 |
| L | 27 | 0.810 |
| H | 28 | 2.326 |
| L | 29 | 0.810 |
| H | 30 | 1.150 |
| L | 31 | 1.000 |

FIG. 3(B)

DESIGN WAVELENGTH λ: 680 nm
L-LAYER: SiO$_2$ (n = 1.44)
H-LAYER: TiO$_2$ (n = 2.266)

| LAYER | | D=n·d·4/λ |
|---|---|---|
| H | 1 | 1.484 |
| L | 2 | 3.0652 |
| H | 3 | 1.603 |
| L | 4 | 1.75048 |
| H | 5 | 0.5128 |
| L | 6 | 1.75048 |
| H | 7 | 0.5128 |
| L | 8 | 1.75048 |
| H | 9 | 0.5128 |
| L | 10 | 1.75048 |
| H | 11 | 0.5128 |
| L | 12 | 1.75048 |
| H | 13 | 0.5128 |
| L | 14 | 1.75048 |
| H | 15 | 0.5128 |
| L | 16 | 1.75048 |
| H | 17 | 0.5128 |
| L | 18 | 1.75048 |
| H | 19 | 0.5128 |
| L | 20 | 1.75048 |
| H | 21 | 0.5128 |
| L | 22 | 1.75048 |
| H | 23 | 0.5128 |
| L | 24 | 1.75048 |
| H | 25 | 0.5128 |
| L | 26 | 1.75048 |
| H | 27 | 0.5128 |
| L | 28 | 1.62764 |
| H | 29 | 0.53964 |
| L | 30 | 0.86692 |

FIG. 6

DESIGN WAVELENGTH λ: 600 nm
SUBSTRATE: GLASS (n = 1.52)
L-LAYER: SiO$_2$ (n = 1.46)
H-LAYER: TiO$_2$ (n = 2.3)

| LAYER | | D=n·d·4/λ |
|---|---|---|
| L | 1 | 0.600 |
| H | 2 | 1.000 |
| L | 3 | 1.000 |
| H | 4 | 1.000 |
| L | 5 | 1.000 |
| H | 6 | 1.000 |
| L | 7 | 1.000 |
| H | 8 | 1.000 |
| L | 9 | 1.000 |
| H | 10 | 1.000 |
| L | 11 | 1.000 |
| H | 12 | 1.000 |
| L | 13 | 1.000 |
| H | 14 | 1.000 |
| L | 15 | 1.000 |
| H | 16 | 1.000 |
| L | 17 | 2.000 |
| H | 18 | 1.000 |
| L | 19 | 2.000 |
| H | 20 | 1.000 |
| L | 21 | 2.000 |
| H | 22 | 1.000 |
| L | 23 | 2.000 |
| H | 24 | 1.000 |
| L | 25 | 2.000 |
| H | 26 | 1.000 |
| L | 27 | 2.000 |
| H | 28 | 1.000 |
| L | 29 | 2.000 |
| H | 30 | 1.000 |
| L | 31 | 2.000 |

FIG. 8(A)

DESIGN WAVELENGTH λ: 600 nm
SUBSTRATE: GLASS (n = 1.52)
L-LAYER: SiO$_2$ (n = 1.46)
H-LAYER: Ta$_2$O$_5$ (n = 2.1)

| LAYER | | D=n·d·4/λ |
|---|---|---|
| L | 1 | 1.000 |
| H | 2 | 0.943 |
| L | 3 | 1.062 |
| H | 4 | 0.943 |
| L | 5 | 1.062 |
| H | 6 | 0.943 |
| L | 7 | 1.062 |
| H | 8 | 0.943 |
| L | 9 | 1.062 |
| H | 10 | 0.943 |
| L | 11 | 1.062 |
| H | 12 | 0.943 |
| L | 13 | 1.062 |
| H | 14 | 0.943 |
| L | 15 | 1.062 |
| H | 16 | 0.994 |
| L | 17 | 2.071 |
| H | 18 | 0.994 |
| L | 19 | 2.071 |
| H | 20 | 0.994 |
| L | 21 | 2.071 |
| H | 22 | 0.994 |
| L | 23 | 2.071 |
| H | 24 | 0.994 |
| L | 25 | 2.071 |
| H | 26 | 0.994 |
| L | 27 | 2.071 |
| H | 28 | 0.994 |
| L | 29 | 2.071 |
| H | 30 | 1.221 |
| L | 31 | 1.000 |

FIG. 8(B)

PROJECTOR

BACKGROUND OF THE INVENTION

1. Field of Invention

The present invention relates to a projector for displaying color images.

2. Description of Related Art

A projector uses a light modulation device, called a light valve, in order to modulate light according to image signals. A known type of projector for displaying color images uses three light valves corresponding to three colors, red light (in the wavelength region of approximately 580 nm to approximately 700 nm), green light (in the wavelength region of approximately 500 nm to approximately 580 nm), and blue light (approximately 400 nm to approximately 500 nm). In most cases, transmissive liquid crystal panels, reflective liquid crystal panels, or the like are used as the light valves.

SUMMARY OF THE INVENTION

It is known hitherto that ultraviolet light having a wavelength shorter than that of blue light (light of approximately 400 nm or less) is a cause of deterioration of the operating characteristics of a liquid crystal panel. In order to prevent this, an ultraviolet cutoff filter is provided to inhibit light having a wavelength of approximately 400 nm or less from reaching the liquid crystal panel.

Although ultraviolet light is cut off by the ultraviolet cutoff filter, the operating characteristics of the projector are sometimes deteriorated due to deterioration of the operating characteristics of a liquid crystal panel for blue light. This phenomenon has become more prominent, in particular, with recent increases in brightness of the light source and increases in efficiency for light utilization of the optical system.

The present invention has been made to at least overcome the above problems in the conventional art, and an object of the invention is to at least provide a technique for inhibiting deterioration of the operating characteristics of a liquid crystal panel, which has been caused by increases in the brightness of images.

In order to solve at least some of the above problems, a projector according to the present invention includes:

a light source;

a wavelength separating optical system for separating light emitted from the light source into light in the plural wavelength regions;

plural light modulation devices provided respectively for light in the plural wavelength regions emitted from the wavelength separating optical system so as to modulate the light in the plural wavelength regions according to a given image signal;

a light synthesizing optical system that synthesizes the light in the plural wavelength regions modulated by the plural light modulation devices; and a projection optical system that projects the synthesized light emitted from the light synthesizing optical system, wherein a reflecting mirror, having a reflectance of approximately 90% or more for light in the wavelength region of approximately 435 nm or more, and a reflectance for light in the wavelength region of 425 nm±5 nm, that is lower than the reflectance for the light in the wavelength region of approximately 435 nm or more, or a light filter having a transmittance of approximately 90% or more, for light in the wavelength region of 435 nm or more of the light in the plural wavelength regions, and a transmittance for light in the wavelength region of at least 425 nm±5 nm, that is lower than the transmittance for the light in the wavelength region of approximately 435 nm or more, is placed in the optical path from the light source to at least one of the light modulation devices.

Herein, "approximately" in for example, "approximately 435 nm", or "approximately 425 nm", means that the value of the design wavelength (435 nm, 425 nm) may include a margin of error. While the allowable error range varies depending on the size of the projector or the like, it is generally ±3 nm.

As a result of examination of the causes of deterioration of the characteristics of the liquid crystal panel for blue light, it was discovered that the operating characteristics of the light modulation device noticeably deteriorates when light in the wavelength region of 425 nm±5 nm (hereinafter referred to as "light with a wavelength of approximately 425 nm") is applied. Although the cause is not yet clear, it is hypothesized that light with a wavelength of approximately 425 nm has an adverse effect on the material (e.g., polyimide) of an alignment film used to align liquid crystal molecules in the liquid crystal panel, and the material (e.g., ITO) of electrodes used to apply voltage to the liquid crystal. In the above projector, a reflecting mirror, having a reflectance of approximately 90% or more for light in the wavelength region of approximately 435 nm or more, of the light in the predetermined wavelength regions, and a reflectance for light in the wavelength region of approximately 425 nm, that is lower than the reflectance for the light in the wavelength region of approximately 435 nm or more, or a light filter having a transmittance of approximately 90% or more, for light in the wavelength region of approximately 435 nm or more, of the light in the predetermined wavelength regions and a transmittance for light in the wavelength region of approximately 425 nm, that is lower than the transmittance for the light in the wavelength region of approximately 435 nm or more, is provided in the optical path from the light source to the light modulation device. Therefore, it is possible to inhibit light with a wavelength of approximately 425 nm from entering the light modulation device. This can prevent the operating characteristics of the light modulation device from deteriorating. It is preferable that the reflectance of the reflecting mirror for light of approximately 425 nm be approximately 20% or less, and preferably, it should be as low as possible. It is preferable that the transmittance of the light filter for light of approximately 425 nm be approximately 20% or less, and preferably, it should be as low as possible.

Preferably, the reflecting mirror or the light filter is disposed in the optical path in which light in a predetermined wavelength region, including light with a wavelength of approximately 425 nm, of light in the plural wavelength regions is separated by the wavelength separating optical system and enters a corresponding light modulation device. When the reflecting mirror or the light filter is placed at such a position, production thereof is facilitated.

Preferably, the reflecting mirror has a reflectance of approximately 90% or more for visible light in the wavelength region of approximately 415 nm or less, and a reflectance for visible light in the wavelength region of approximately 425 nm, that is lower than the reflectance for visible light in the wavelength region of approximately 415 nm or less. Preferably, the light filter has a transmittance of approximately 90% or more for visible light in the wavelength region of approximately 415 nm or less, of the light in the predetermined wavelength regions, and a transmittance for visible light in the wavelength region of approximately 425, that is lower than the transmittance for visible light in the wavelength region of approximately 415 nm or less.

Since this allows not only light in the wavelength region of approximately 435 nm or more of the light in the predetermined wavelength regions, but also light in the wavelength region of approximately 415 nm or less to be used in the light modulation device, it is possible to prevent the operating characteristics of the light modulation device from deteriorating and to ensure a sufficient intensity of light.

BRIEF DESCRIPTION OF THE DRAWINGS

FIGS. 3(A) and 3(B) include explanatory views showing the thicknesses of layers in the reflecting film 224R.

FIG. 6 is an explanatory view showing the thicknesses of layers of a transmissive film formed in a light filter.

FIGS. 8(A) and 8(B) are explanatory views showing other structures of the reflecting film 224R.

DETAILED DESCRIPTION OF PREFERRED EMBODIMENTS

A. Configuration of Projector

Figure 1:
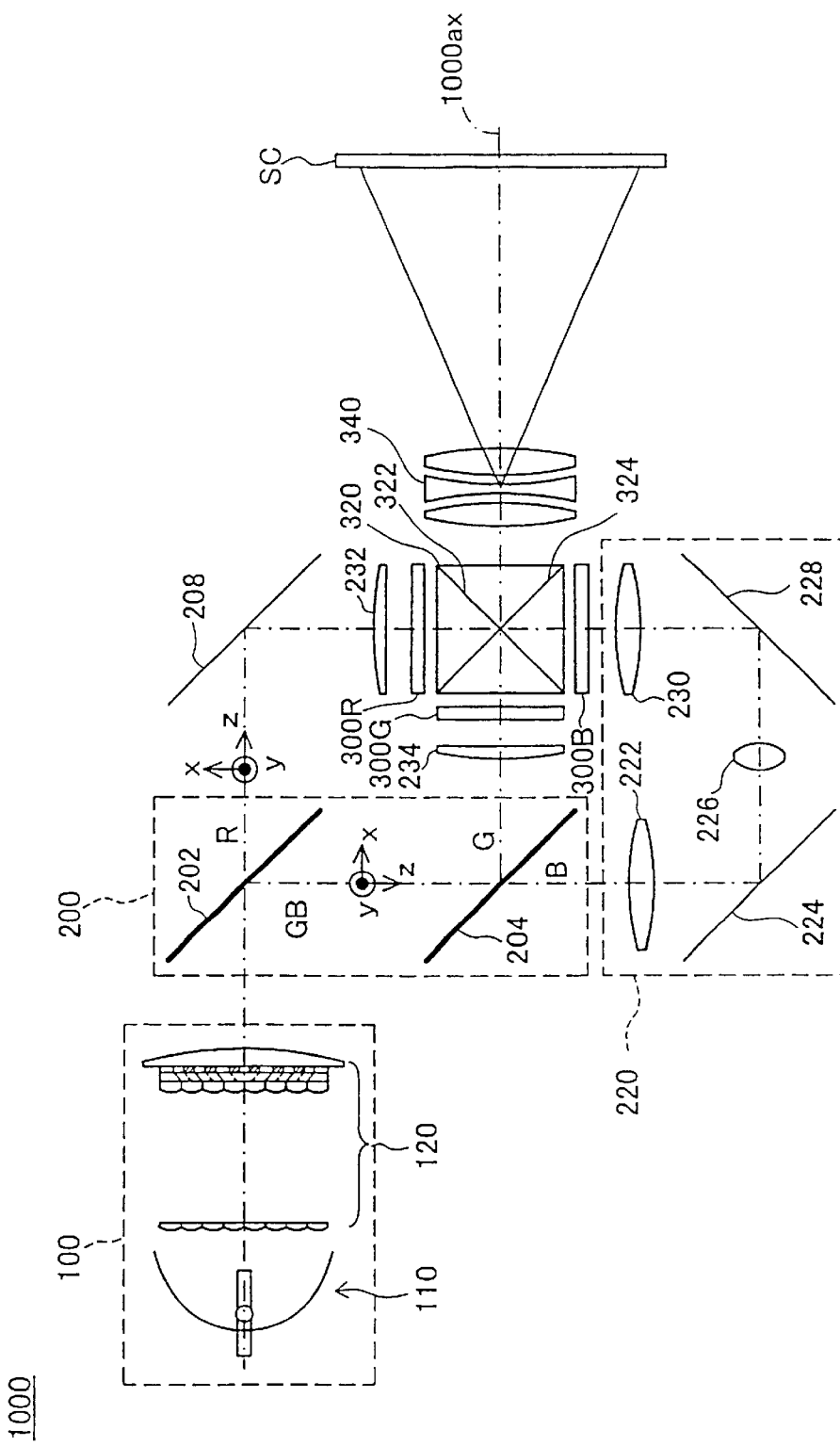
FIG. 1 is a general structural plan view showing the principal part of a projector according to the present invention.

FIG. 1 is a general structural plan view showing the principal part of a projector according to an exemplary embodiment of the present invention. This projector 1000 may consist of, as main constituents, an illumination optical system 100, a color separating optical system 200, a relay optical system 220, three liquid crystal light valves 300R, 300G, and 300B, a cross-dichroic prism 320, and a projection optical system 340. The projector 1000 separates light emitted from the illumination optical system 100 into colored light of three colors, red (R), green (G), and blue (B), by the color separating optical system 200, modulates the separated colored light through the liquid crystal light valves 300R, 300G, and 300B according to image signals for the colors, synthesizes the modulated colored light by the crossed dichroic prism 320, and displays an image on a screen SC via the projection optical system 340.

The illumination optical system 100 may consist of a light source 110 and a polarized light generating device 120. The polarized light generating device 120 has a function of converting nonpolarized light emitted from the light source 110 into linearly polarized light polarized in the same direction. The illumination optical system 100 thereby emits illumination light formed of linearly polarized light (s-polarized light or p-polarized light) polarized in the same direction, and illuminates the liquid crystal light valves 300R, 300G, and 300B via the color separating optical system 200 and the relay optical system 220. In this embodiment, illumination light of s-polarized light is emitted. The structure and functions of the illumination optical system are described in detail in, for example, Japanese Unexamined Patent Application Publication No. 10-177151, disclosed by the present applicant, and therefore, a description thereof is omitted in this specification.

The color separating optical system 200 includes two dichroic mirrors 202 and 204, and functions as a wavelength separating optical system for separating a light beam emitted from the illumination optical system 100 into colored light of three colors, red (approximately 580 nm to approximately 700 nm), green (approximately 500 nm to approximately 580 nm), and blue (approximately 400 nm to approximately 500 nm).

The first dichroic mirror 202 transmits a red light component of light emitted from the illumination optical system 100, and reflects blue and green light components, thereby separating the red light R. The red light R passed through the first dichroic mirror 202, is reflected toward the crossed dichroic prism 320 by a reflecting mirror 208, passes through a field lens 232, and reaches the liquid crystal light valve for red light 300R. This field lens 232 converts sub (partial) light beams emitted from the illumination optical system 100 into light beams in parallel with the center axis thereof. This also applies to field lenses 234 and 230 disposed in front of the other liquid crystal light valves.

The second dichroic mirror 204 reflects the green light G of the blue light B and the green light G that has been reflected by the first dichroic mirror 202 and transmits the blue light, thereby separating the green light G and the blue light B. The green light G reflected by the second dichroic mirror 204 is emitted toward the crossed dichroic prism 320, passes through the field lens 234, and reaches the liquid crystal light valve for green light 300G. In contrast, the blue light B passed through the second dichroic mirror 204 enters the relay optical system 220.

The blue light B, which has been incident on the relay optical system 220, passes through an incident-side lens 222, a relay lens 226, reflecting mirrors 224 and 228, an emitting side lens (field lens) 230 included in the relay optical system 220, and reaches the liquid crystal light valve for blue light 300B. The relay optical system is used for the blue light B in order to prevent the efficiency for light utilization from being reduced because the optical path length of the blue light B is longer than those of the other colored light, that is, in order to transmit the blue light, incident on the incident-side lens 222, unchanged to the emitting side lens 230. The distances from the first dichroic mirrors 202 in the color separating optical system 200 to the liquid crystal light valve 300R, the liquid crystal light valve 300G, and the incident-side lens 222 are set to be substantially equal.

The three liquid crystal light valves 300R, 300G, and 300B function as optical modulating devices for forming images by modulating three colored lights according to image information (image signals) given thereto. Each of the three liquid crystal light valves 300R, 300G, and 300B is composed of a light-transmissive liquid crystal panel, and two polarizers placed on the light incident side and the light emergent side of the liquid crystal panel. The polarizer placed on the light incident side of the liquid crystal panel serves to further increase the degree of polarization of illumination light, and is placed so that the direction of polarization of linearly polarized light (spolarized light) emitted from the illumination optical system 100 coincides with the direction of the transmission axis of these polarizers. This can further increase the purity (degree of polarization) of linearly polarized light contained in illumination light emitted from the illumination optical system. When the degree of polarization of illumination light emitted from the illumination optical system 100 is considerably high, the polarizer placed on the light incident side may be omitted.

The cross-dichroic prism 320 functions as a light synthesizing optical system for synthesizing light of three colors modulated through the liquid crystal light valves 300R, 300G, and 300B and emitting a synthesized light showing a color image. In the cross-dichroic prism 320, a red-light reflecting dichroic face 321 with a dielectric multilayer film for reflecting red light and a blue-light reflecting dichroic face 322 with a dielectric multilayer film for reflecting blue light are formed substantially in the shape of an X on the interfaces of four rectangular prisms. The three colored light is synthesized by the red-light reflecting dichroic face 321 and the blue-light reflecting dichroic face 322, and synthesized light is formed to project a color image. The synthesized light generated by the cross-dichroic prism 320 is emitted toward the projection optical system 340.

The projection optical system 340 projects the synthesized light emitted from the cross-dichroic prism 320, and displays a color image on the screen SC. As the projection optical system 340, a telecentric lens may be used.

B. Structure of Reflecting Mirror 224

The projector 1000 is characterized by the reflecting mirror 224 of the relay optical system 220. The reflecting mirror 224 has a function of reflecting blue light B toward the liquid crystal light valve 300B, as described above.

Figure 2:
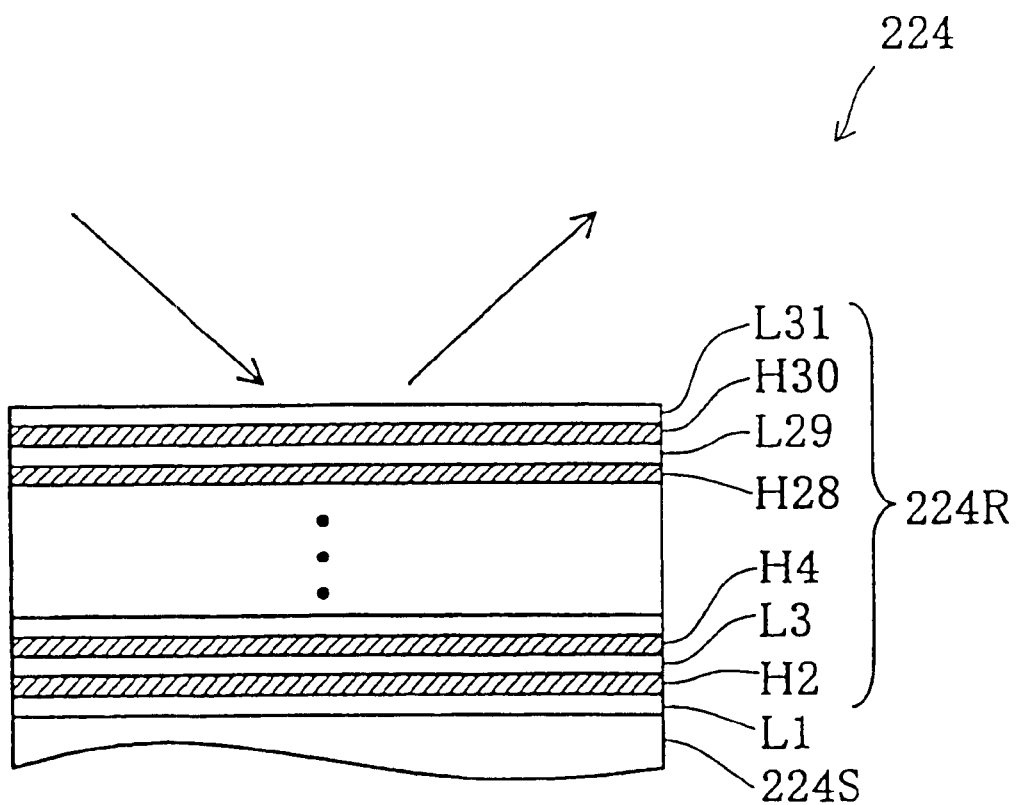
FIG. 2 is an enlarged sectional view of a reflecting film 224R forming a reflecting surface of a reflecting mirror 224.

FIG. 2 is an enlarged sectional view of a reflecting film 224R that forms a reflecting surface of the reflecting mirror 224. The reflecting film 224R is a dielectric multilayer film placed on a transmissive substrate 224S, and has a multi-layered structure in which two kinds of materials are alternately stacked in a total of thirty-one layers.

The reflecting film 224R is formed by stacking layers having a relatively low refractive index, compared with the transmissive substrate 224S, having an refractive index of approximately 1.5, (hereinafter referred to as "L-layers") and layers having a relatively high refractive index (hereinafter referred to as "H-layers") on the transmissive substrate 224S. In the example shown in FIG. 2, a total of thirty-one layers, L1, H2, L3, H4, . . . , L29, H30, and L31, are formed. As the material of the transmissive substrate 224S, various materials having an refractive index of 1.48 to 1.58 may be used, and a white-transmissive plate material having a refractive index of approximately 1.52 and optical glass, such as BK7-S (from Schott Glaswerke), may be used. $SiO_2$ having a refractive index of approximately 1.46 may be used as the material of the L-layers in the reflecting film 224R, and $TiO_2$ having a refractive index of approximately 2.3, or $Ta_2O_5$ having a refractive index of approximately 2.1 may be used as the material of the H-layers. It is known that the refractive indices of the layers vary due to absorption of moisture in the air or the like. In this specification, "refractive index" refers to a refractive index maintained in a state in which the reflecting film 224R is exposed to the air for a long period.

FIG. 3 includes explanatory views showing the thicknesses of the layers in the reflecting film 224R. FIG. 3(A) shows a case in which $TiO_2$ is used as the material of the H-layers, and FIG. 3(B) shows a case in which $Ta_2O_5$ is used. These structures are set for when the design wavelength λ is 600 nm. In FIGS. 3(A) and 3(B), values D in the right column correspond to values obtained by dividing the optical thicknesses of the layers (the thicknesses obtained by multiplying the actual thicknesses d by the refractive index n of the material) by ¼ of the design wavelength λ. Therefore, the actual thicknesses d are obtained by multiplying the values D by λ/4 and dividing the product by n. For the refractive index n in this case, the refractive index of the L-layers is used for the L-layers, and the refractive index for the H-layers is used for the H-layers. As shown in FIGS. 3(A) and 3(B), the optical thicknesses of the layers are different from one another, on the basis of approximately λ/4.

Figure 4:
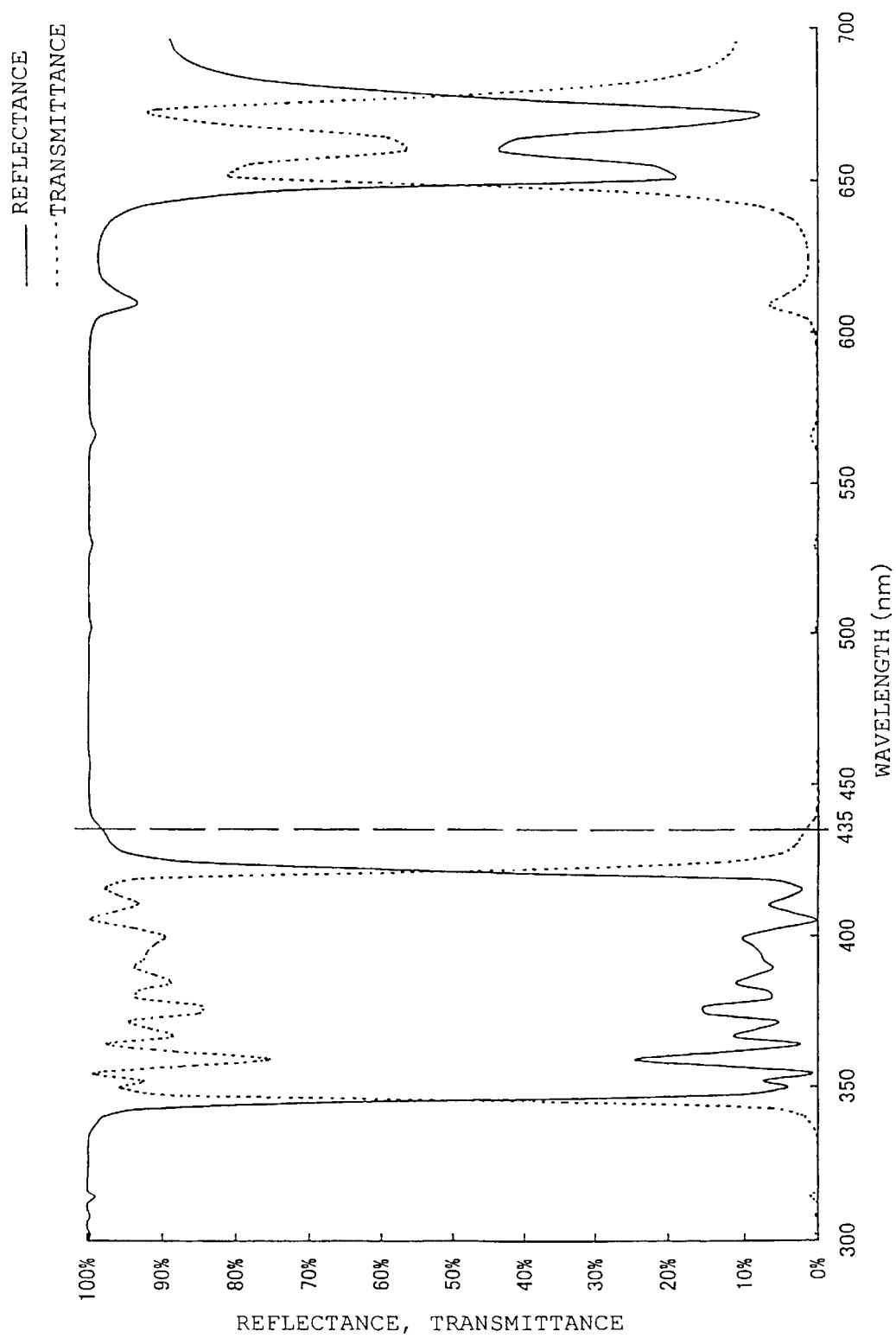
FIG. 4 is a graph showing the simulation results of the optical characteristics for s-polarized light of the reflecting mirror 224 using the reflecting film with the structure shown in FIG. 3(A).
Figure 5:
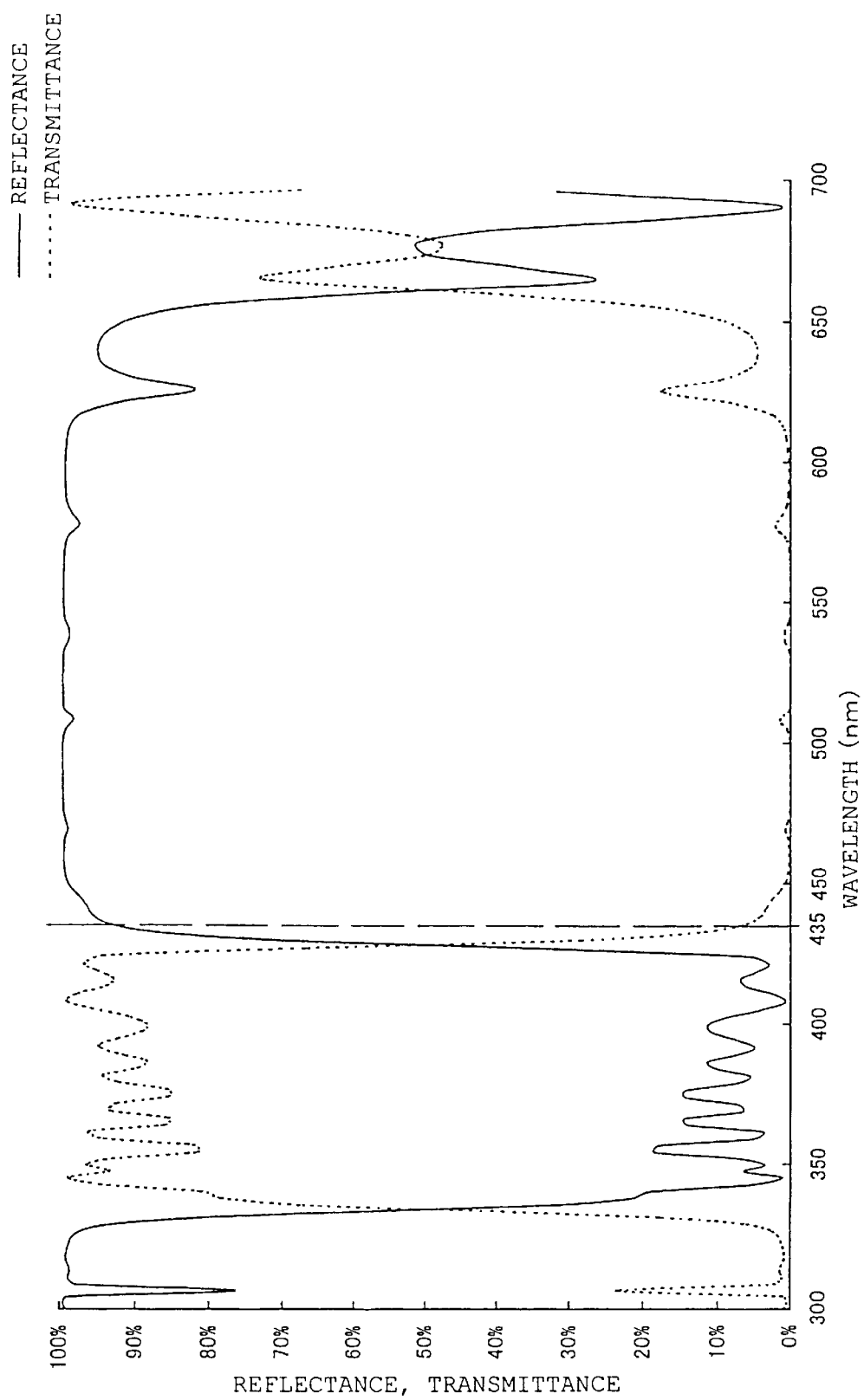
FIG. 5 is a graph showing the simulation results of the optical characteristics for s-polarized light of the reflecting mirror 224 using the reflecting film with the structure shown in FIG. 3(B).

FIG. 4 is a graph showing the simulation results of optical characteristics for s-polarized light of the reflecting mirror 224 when the reflecting film with the structure shown in FIG. 3(A) is used. As is shown in this graph, the reflecting film has such characteristics that the reflectance for light with wavelengths of approximately 435 nm or more of light (blue light) with wavelengths in the region of approximately 400 mm to approximately 500 nm is a high reflectance of approximately 98% or more, whereas the reflectance for light of approximately 400 nm to 435 nm rapidly decreases and the transmittance increases as the wavelength decreases. FIG. 5 is a graph showing the simulation results of optical characteristics for s-polarized light of the reflecting mirror 224 when the reflecting film with the structure shown in FIG. 3(B) is used. As is shown in this graph, the reflecting film shown in FIG. 3(B) also has such characteristics that the reflectance for light of approximately 435 nm or more is a high reflectance of approximately 94% or more, whereas the reflectance for light of approximately 400 nm to 435 nm rapidly decreases and the transmittance increases as the wavelength decreases, in a manner similar to that of the reflecting film shown in FIG. 3(A).

As described above, it is hypothesized that, when light in the wavelength region of approximately 425 nm, that is, light in the wavelength region of 425 nm±5 nm, is applied, the operating characteristics of the light modulation device substantially deteriorate because light with a wavelength of approximately 425 nm has an adverse effect on the material of an alignment film used in the liquid crystal panel for aligning liquid crystal molecules and on the material of electrodes used for applying voltage to the liquid crystal. Since the reflecting mirror 224, using the reflecting film with the structure shown in FIG. 3(A) or FIG. 3(B) can inhibit the reflection of blue light of approximately 400 nm to approximately 435 nm, as shown in the graph of FIG. 4 or FIG. 5, it is possible to prevent the operating characteristics from deteriorating due to the entry of the light with a wavelength of approximately 425 nm into the liquid crystal light valve for blue light 300B.

A method may be possible which inhibits light with a wavelength of approximately 425 nm from entering the liquid crystal light valve for blue light 300B by providing, in the optical path between the second dichroic mirror 204 and the liquid crystal light valve 300B, a light filter with a transmissive film for transmitting light of approximately 435 nm or more, and reflecting or absorbing light of approximately 400 nm to 435 nm, of blue light in the wavelength region of approximately 400 nm to approximately 500 nm.

Figure 7:
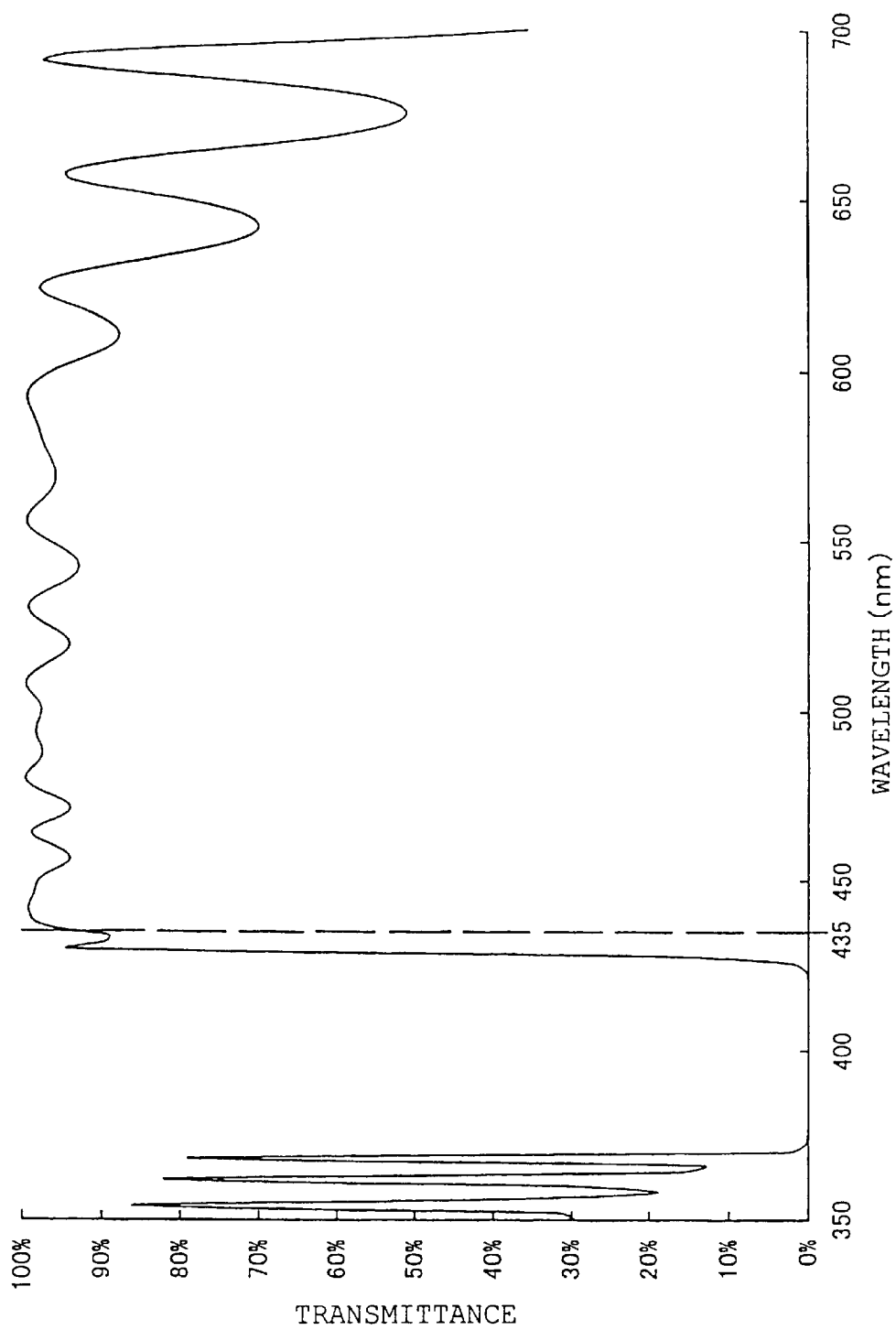
FIG. 7 is a graph showing the transmission characteristics for s-polarized light of the light filter using the transmissive film with the structure shown in FIG. 6.

FIG. 6 is an explanatory view showing the thicknesses of layers of the transmissive film formed in the light filter. This transmissive film is also a dielectric multilayer film formed on a transmissive substrate, in a manner similar to the reflecting film shown in FIGS. 3(A) and 3(B) or FIGS. 8(A) and 8(B), and has a multilayered structure in which two kinds of materials are alternatively stacked in a total of thirty-one layers. FIG. 7 is a graph showing the transmission characteristics for s-polarized light of the light filter using the transmissive film with the structure shown in FIG. 6. In a case in which this light filter is used, the transmittance for light within a wavelength region of approximately 435 nm or less also rapidly decreases as the wavelength decreases, as shown in FIG. 7. Therefore, since the above-described light having a wavelength of approximately 425 nm can also be inhibited from passing through the light filter and entering the liquid crystal light valve for blue light 300B in the comparative example, the operating characteristics of the liquid crystal light valve for blue light 300B can be prevented from deteriorating.

In the case of the light filter, however, since the thicknesses of H-layers, excluding a layer H1, must be thinned to approximately half the thicknesses of the H-layers shown in FIGS. 3(A), 3(B), 8(A) and 8(B), as shown in FIG. 6, it is more difficult to control film formation than in the reflecting mirror. Therefore, the reflecting mirror is more advantageous in that it can be produced relatively easily.

Since the light filter basically transmits light, in general, it is preferable to form an antireflection film at-least on the light emitting side of the light filter. In contrast, since the reflecting mirror 224 basically reflects light, it has an advantage of omitting an antireflection film.

As described above, the reflecting mirror 224 using the reflecting film with the structure shown in FIG. 3(A) or 3(B) and the light filter with the structure shown in FIG. 6 can inhibit light of approximately 400 nm to approximately 435 nm from entering the liquid crystal light valve 300B, so the operating characteristics can be prevented from deteriorating due to the entry of the above-described light having a wavelength of approximately 425 nm into the liquid crystal light valve for blue light 300B.

FIG. 8 includes explanatory views showing other structures of the reflecting film 224R. FIGS. 8(A) and 8(B) are the same as FIGS. 3(A) and 3(B), except that the design thicknesses of the layers are different.

Figure 9:
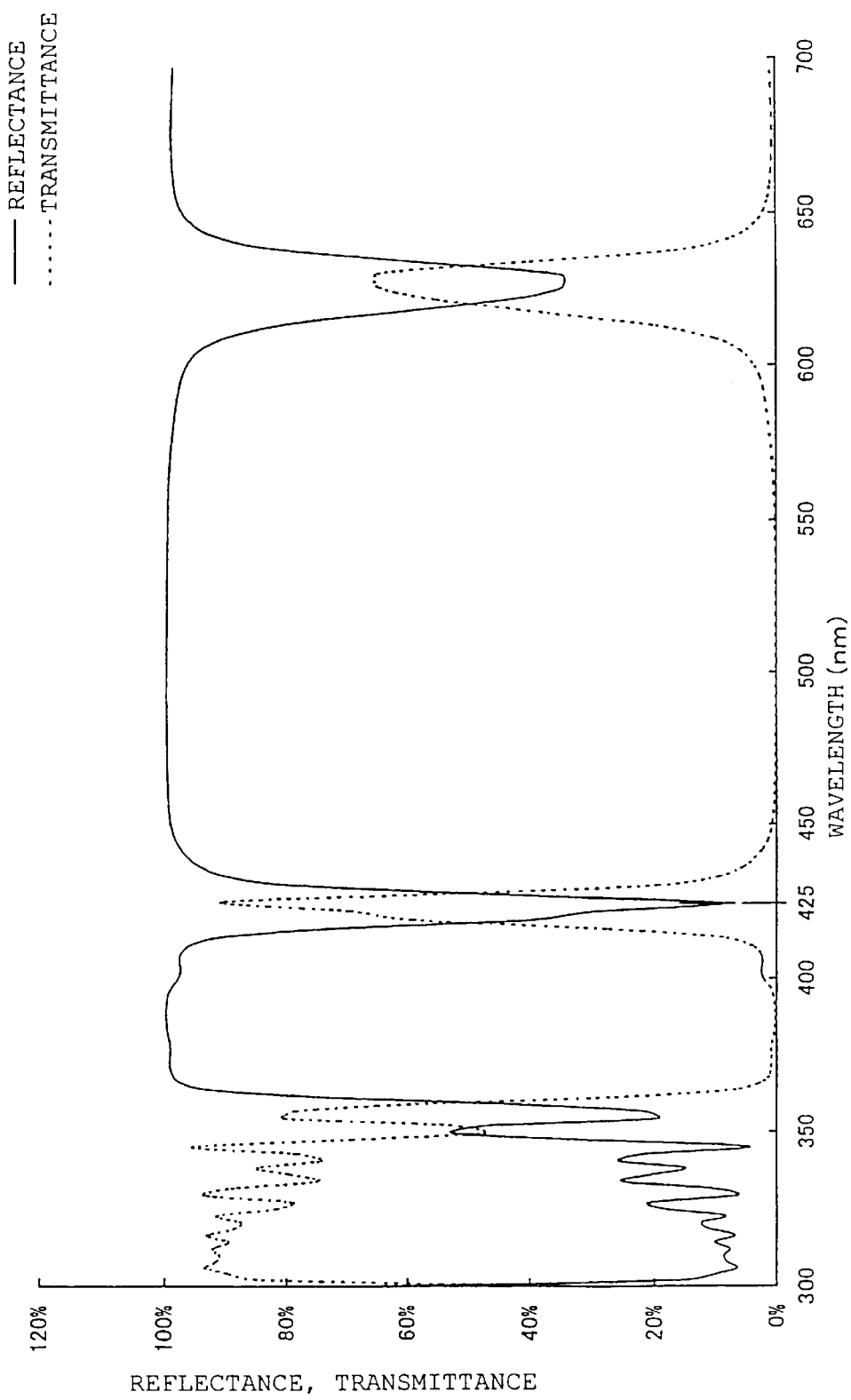
FIG. 9 is a graph showing the simulation results of the optical characteristics for s-polarized light of the reflecting mirror 224 using the reflecting film with the structure shown in FIG. 8(A).
Figure 10:
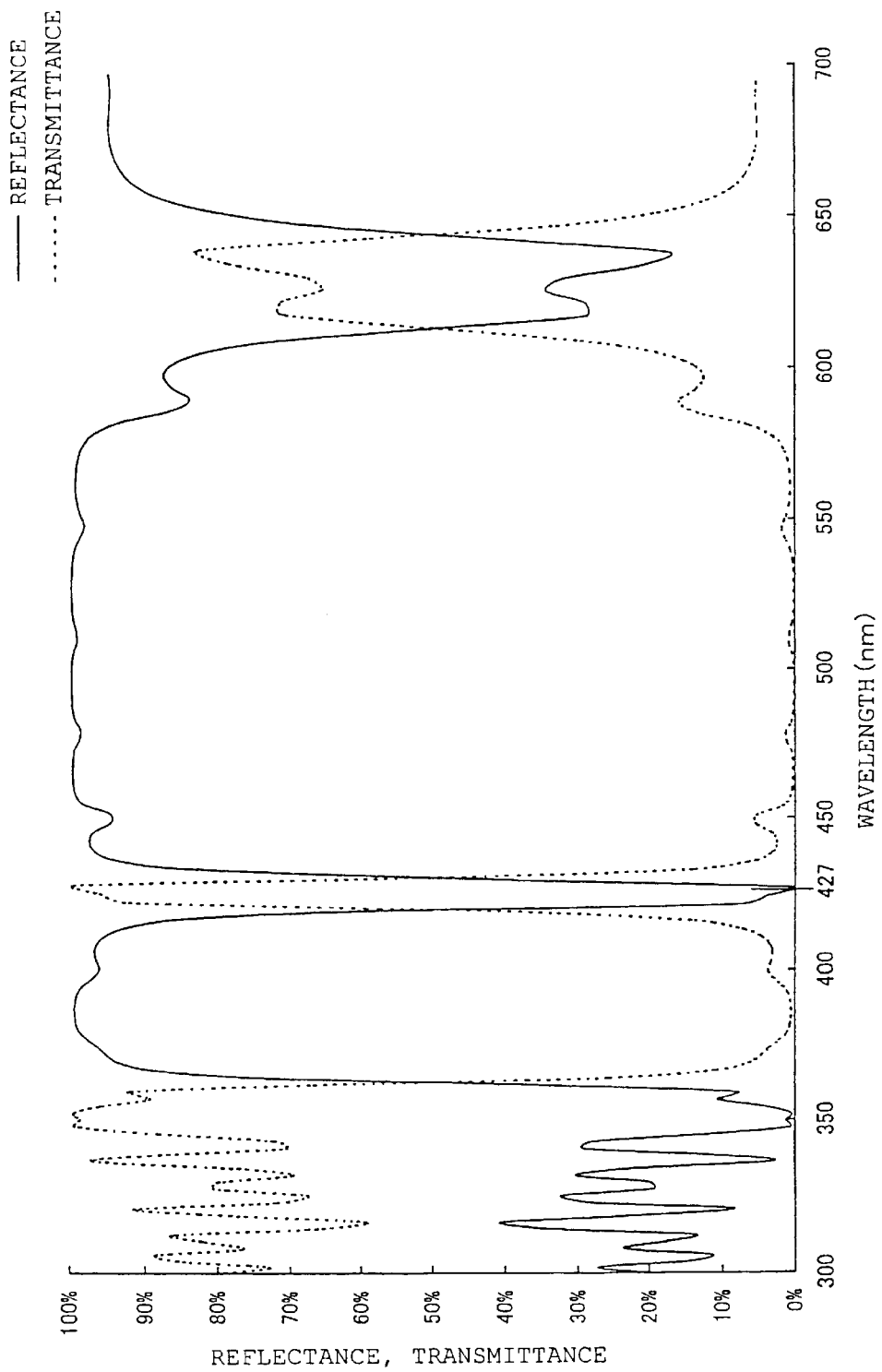
FIG. 10 is a graph showing the simulation results of the optical characteristics for s-polarized light of the reflecting mirror 224 using the reflecting film with the structure shown in FIG. 8(B).

FIG. 9 is a graph showing the simulation results of optical characteristics for s-polarized light of the reflecting mirror 224 using the reflecting film with the structure shown in FIG. 8(A). As this graph shows, the reflecting film has such characteristics that the reflectance is low only for light having a wavelength of approximately 425 nm (light in the wavelength region of 425 nm±5 nm) of blue light in the wavelength region of approximately 400 nm to approximately 500 nm, and is high for light with wavelengths longer or shorter than that. FIG. 10 is a graph showing the simulation results of optical characteristics for s-polarized light of the reflecting mirror 224 using the reflecting film with the structure shown in FIG. 8(B). As this graph shows, in a manner similar to the reflecting film shown in FIG. 8(A), the reflecting film shown in FIG. 8(B) also has such characteristics that the reflectance is low for light having a wavelength of approximately 425 nm (light in the wavelength region of 425 nm±5 nm) of blue light in the wavelength region of approximately 400 nm to approximately 500 nm, and is high for light with wavelengths longer or shorter than that.

Since the reflecting mirror 224 using the reflecting film with the structure shown in FIG. 8(A) or 8(B) can inhibit light having a wavelength of approximately 425 nm from being reflected, as shown in FIG. 9 or FIG. 10, the operating characteristics can be prevented from deteriorating due to the entry of the above-described light having a wavelength of approximately 425 nm into the liquid crystal light valve for blue light 300B. Furthermore, the reflecting films shown in FIGS. 8(A) and FIG. 8(B) have a high reflectance for light with wavelengths of less than approximately 425 nm, and they can positively use light in the wavelength region which cannot be used in the cases of the reflecting films shown in FIGS. 3(A) and 3(B), that is, light with wavelengths of less than approximately 425 nm of blue light in the wavelength region of approximately 400 nm to approximately 500 nm. This can extend the wavelength region that can be used as blue light. Accordingly, it is possible to further increase the brightness of the blue color to be displayed. Furthermore, since all the light in the wavelength region of approximately 400 nm to approximately 500 nm, excluding light with a wavelength of approximately 425 nm, can be used as blue light, it is possible to display more natural blue light.

The present invention is not limited to the above embodiments and examples, and may be carried out in various modes without departing from the scope of the invention. For example, the following modifications are possible.

(1) In the above embodiments, the reflecting films with the structures shown in FIGS. 3(A), 3(B), 8(A) and 8(B), and the light filter with the structure shown in FIG. 6 are examples, and the structures of the reflecting film 224R of the reflecting mirror 224 and the light filter are not limited thereto. For example, it is satisfactory as long as they have such characteristics that the reflectance or transmittance is as high as approximately 90% or more for light in the wavelength region of approximately 435 nm or more of blue light, in the wavelength region of approximately 400 nm to approximately 500 nm, and is lower for light in the wavelength region of approximately 435 nm or less, than for light in the wavelength region of approximately 435 nm or more. Furthermore, it is satisfactory as long as they have such characteristics that the reflectance for light with a wavelength of approximately 425 nm (in the wavelength region of 425 nm±5 nm) of blue light, in the wavelength region of approximately 400 nm to approximately 500 nm, is lower than for light in the wavelength region of approximately 435 nm or more, and of approximately 415 nm or less. That is, it is satisfactory as long as they have such characteristics that the reflectance for light in the wavelength region of approximately 435 nm or more of blue light, in the wavelength region of approximately 400 nm to approximately 500 nm, is high, approximately 90% or more, and the reflectance at least for light with a wavelength of approximately 425 nm (in the wavelength region of 425 nm±5 nm), is lower than the reflectance for light in the wavelength region of approximately 435 nm or more. In other words, it is satisfactory as long as they have such characteristics as to inhibit light with a wavelength of approximately 425 nm from entering the liquid crystal light valve for blue light 300B. It is preferable that the reflectance for light of 435 nm or more be as high as possible. While a preferable reflectance for light in the wavelength region of 425 nm±5 nm is approximately 20% or less, it is preferable that the reflectance be as low as possible.

(2) While the reflecting film 224R of the reflecting mirror 224 has the structure shown in FIGS. 3(A), 3(B), 8(A) or 8(B) in the above description of the embodiments, the present invention is not limited thereto. For example, the reflecting film of the reflecting mirror 228 may have the structure shown in FIGS. 3(A), 3(B), 8(A) or 8(B). That is, it is satisfactory as long as the reflecting film of the reflecting mirror placed in the optical path, in which light in the wavelength region of approximately 400 nm to approximately 500 nm, that is, blue light, is separated by the colored light separating optical system 200 and enters the liquid crystal light valve for blue light 300B, has the structure shown in FIGS. 3(A), 3(B), 8(A) or 8(B). For example, the following is possible.

Figure 11:
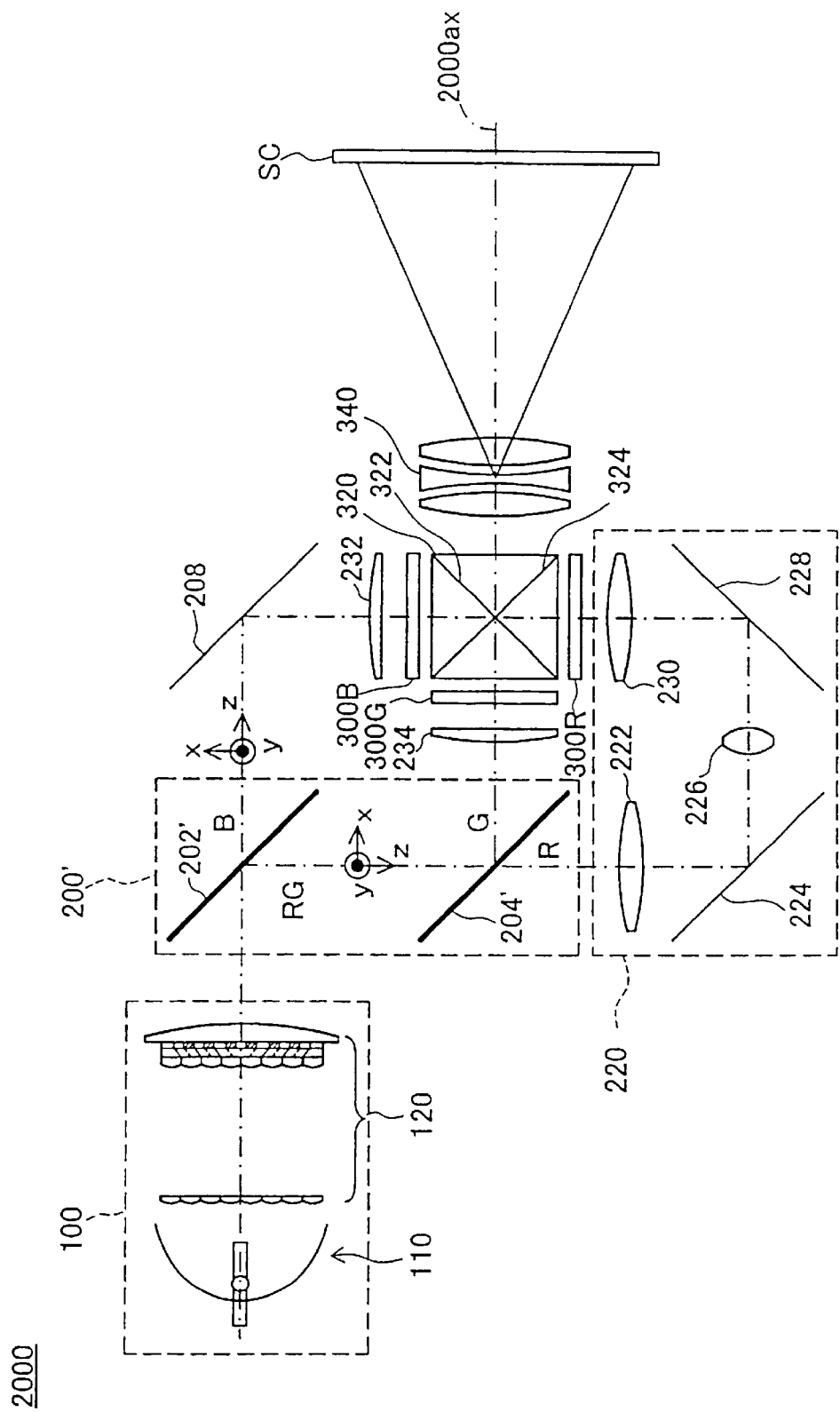
FIG. 11 is a general structural plan view showing the principal part of another projector.

FIG. 11 is a general structural plan view showing the principal part of another projector. This projector 2000 has a configuration in which the liquid crystal light valve for red light 300R and the liquid crystal light valve for blue light 300B in the projector 1000 shown in FIG. 1 are transposed, and the color separating optical system 200 is replaced with a color separating optical system 200'.

With this replacement, a first dichroic mirror 202' of the color separating optical system 200' reflects red light R and green light G of light emitted from an illumination optical system 100, and transmits blue light B. A second dichroic mirror 204' transmits the red light R of the red and green light, R and G, reflected by the first dichroic mirror 202', and reflects the green light G. The blue light B emitted from the color separating optical system 200' is reflected by a reflecting mirror 208, and enters a liquid crystal light valve for blue light 300B. The green light G enters a liquid crystal light valve for green light 300G. The red light R enters a liquid crystal light valve for red light 300R via a relay optical system 220.

In the projector having the above-described configuration, a reflecting film of the reflecting mirror 208 for reflecting blue light B may have the structure shown in FIGS. 3(A), 3(B), 8(A) or 8(B).

(3) While the projector of the above embodiments have liquid crystal light valves using transmissive liquid crystal panels in the above description, the present invention is not limited thereto. The present invention is also applicable to a projector having liquid crystal light valves using reflective liquid crystal panels.

(4) While the liquid crystal light valves are provided as light modulation devices in the above embodiments, the present invention is not limited thereto. The present invention is also applicable to a projector having, as light modulation devices, devices which are affected by light of approximately 425 nm.

(5) While the reflecting mirror or the light filter having such characteristics as to inhibit light having a wavelength of approximately 425 nm from entering the liquid crystal light valve is placed in the optical path of blue light in the above embodiments, the present invention is not limited thereto. A reflecting mirror or a light filter may be placed at any position in the optical path from the light source to the liquid crystal light valve.

What is claimed is:

1. A projector that projects and displays an image, comprising:
   a light source;
   a wavelength separating optical system that separates light emitted from said light source into a plurality of wavelength regions;
   plural light modulation devices provided respectively for light in the plural wavelength regions emitted from said wavelength separating optical system that modulate the light in the plural wavelength regions according to a given image signal;
   a light synthesizing optical system that synthesizes the light in the plural wavelength regions modulated by said plural light modulation devices;
   a projection optical system that projects the synthesized light emitted from said light synthesizing optical system; and
   a reflecting mirror, having a reflectance of approximately 90% or more for light in the wavelength region of approximately 435 nm or more, and a reflectance for light in the wavelength region of at least 425 nm±5 nm, that is lower than the reflectance for the light in the wavelength region of approximately 435 nm or more, placed in an optical path from said light source to at least one of said light modulation devices.

2. A projector according to claim 1, said reflecting mirror being disposed in the optical path in which light in a predetermined wavelength region, including light with a wavelength of approximately 425 nm, of light in the plural wavelength regions, is separated by said wavelength separating optical system and entering a corresponding light modulation device.

3. A projector according to claim 1, said reflecting mirror having a reflectance of approximately 90% or more for visible light in the wavelength region of approximately 415 nm or less, and a reflectance for visible light in the wavelength region of at least 425 nm±5 nm, that is lower than the reflectance for the visible light in the wavelength region of approximately 415 nm or less.

4. A projector that projects and displays images, comprising:
   a light source;
   a wavelength separating optical system that separates light emitted from said light source into a plurality of wavelength regions;
   plural light modulation devices provided respectively for light in the plural wavelength regions emitted from said wavelength separating optical system that modulate the light in the plural wavelength regions according to a given image signal;
   a light synthesizing optical system that synthesizes the light in the plural wavelength regions modulated by said plural light modulation devices; and
   a projection optical system that projects the synthesized light emitted from said light synthesizing optical system; and
   a light filter, having a transmittance of approximately 90% or more, for light in the wavelength region of 435 nm or more, and a transmittance for light in the wavelength region of at least 425 nm±5 nm, that is lower than the transmittance for the light in the wavelength region of approximately 435 nm or more, placed in an optical path from said light source to at least one of said light modulation devices.

5. The projector according to claim 4, said light filter being disposed in the optical path in which light in a predetermined wavelength region, including light with a wavelength of approximately 425 nm, of light in the plural wavelength regions, is separated by said wavelength separating optical system and entering a corresponding light modulation device.

6. The projector according to claim 4, wherein said light filter having a transmittance of approximately 90% or more for visible light in the wavelength region of approximately 415 nm or less, and a transmittance for visible light in the wavelength region of at least 425 nm±5 nm, that is lower than the transmittance for the visible light in the wavelength region of approximately 415 nm or less.

7. The projector according to claim 2, said reflecting mirror having a reflectance of approximately 90% or more for visible light in the wavelength region of approximately 415 nm or less, and a reflectance for visible light in the wavelength regions, and a reflectance for visible light in the wavelength region of at least 425 nm±5 nm, that is lower than the reflectance for the visible light in the wavelength region of approximately 415 nm or less.

8. The projector according to claim 5, wherein said light filter having a transmittance of approximately 90% or more of visible light in the wavelength region of approximately 415 nm or less, and a transmittance for visible light in the wavelength region of at least 425 nm, that is lower than the transmittance for the visible light in the wavelength region of approximately 415 nm or less.

* * * * *